Aug. 12, 1947. R. M. CARRIER, JR Re. 22,904

CONVEYING AND PROCESSING APPARATUS

Original Filed Aug. 15, 1942 6 Sheets-Sheet 1

Inventor
ROBERT M. CARRIER, JR.

by Charles W. Hills Attys.

Aug. 12, 1947. R. M. CARRIER, JR Re. 22,904

CONVEYING AND PROCESSING APPARATUS

Original Filed Aug. 15, 1942 6 Sheets-Sheet 2

Inventor
ROBERT M. CARRIER, JR.

by Charles W. Hills Attys.

CONVEYING AND PROCESSING APPARATUS

Original Filed Aug. 15, 1942 6 Sheets-Sheet 3

Inventor
ROBERT M. CARRIER, JR.

by Charles W. Hills Attys.

Aug. 12, 1947. R. M. CARRIER, JR Re. 22,904

CONVEYING AND PROCESSING APPARATUS

Original Filed Aug. 15, 1942 6 Sheets-Sheet 4

Inventor
ROBERT M. CARRIER, JR.

by Charles W. Hills Atty.

CONVEYING AND PROCESSING APPARATUS

Original Filed Aug. 15, 1942 6 Sheets-Sheet 5

Inventor
ROBERT M. CARRIER, JR.

by Charles W. Hills Attys.

Aug. 12, 1947. R. M. CARRIER, JR Re. 22,904

CONVEYING AND PROCESSING APPARATUS

Original Filed Aug. 15, 1942 6 Sheets-Sheet 6

Inventor
ROBERT M. CARRIER, JR.

by Charles W. Hills Attys.

Reissued Aug. 12, 1947

Re. 22,904

UNITED STATES PATENT OFFICE 22,904

CONVEYING AND PROCESSING APPARATUS

Robert M. Carrier, Jr., Aurora, Ill.

Original No. 2,374,664, dated May 1, 1945, Serial No. 480,935, March 29, 1943, which is a division of Serial No. 454,969, August 15, 1942. Application for reissue April 27, 1946, Serial No. 665,547

12 Claims. (Cl. 198—220)

This invention relates to improvements in conveying or processing apparatus, the invention being highly desirable for use in connection with conveying or movement of discrete material or the equivalent, although the invention may have other uses and purposes as will be apparent to one skilled in the art.

The instant application is a division of my copending application for patent entitled "Method and means for conveying materials," filed August 15, 1942, Serial No. 454,969, now abandoned.

In the past, many and various types of gyratory oscillatory, shaker, etc., conveyors and screens have been developed. However, these formerly known devices were objectionable in that in most instances they were not capable of conveying material horizontally or upwardly along an incline, nor were they capable of conveying material along a laterally arcuate conveyor surface, either horizontally or upwardly. In those rare instances where a conveyor has been developed for the purpose of conveying material upwardly by a shaker or gyratory action of the conveyor surface, some force other than the action of the conveyor was depended upon as the prime factor in actually causing a movement of the material in the desired direction, such as, for example, the pushing action of more material coming onto the conveyor, as in the case of a gyratory digger. Further these formerly known devices were not capable of conveying by virtue of the action of the conveying surface in any direction to provide a continuous, smooth, substantially uniform flow of material, nor could they maintain the material in substantially constant contiguity or constant contact with the surface of the conveyor. Certain of these failures of the prior art conveyors were due to the fact that the parts and operations of the conveyor could not be correlated relatively to each other to perform the results desired. In addition, most of these formerly known devices were further objectionable in that they were not reversible, very limited in speed of flow, could not be properly counterbalanced, operated at an objectionably high speed, and were not sufficiently economical to both manufacture and use.

With the foregoing in mind, it is an important object of the instant invention to provide a conveyor having an elongated bed which by virtue of the bodily cyclic movement of the conveying surface will cause a movement of material upwardly along the inclined conveyor surface.

Another object of the invention resides in the provision of conveying apparatus embodying an elongated conveyor surface which by virtue of a bodily movement of the conveyor surface through an orbital curvilinear path will cause material to move upwardly along the inclined conveying surface in a substantially smooth and continuous flow.

Also an object of this invention resides in the provision of conveying apparatus which by virtue of a bodily and cyclical movement of the conveying surface will move material along a laterally curvate path.

It is also an object of this invention to provide conveying apparatus including a helical conveying surface, which apparatus by virtue of bodily movement of the helical surface in an oscillatory manner will cause material to move upwardly along the helical conveyor surface.

Still another feature of the invention resides in the provision of conveying apparatus including a conveying surface laterally curvate in character and wherein the conveyor surface is moved through an orbital path relatively to its axis of curvature so as to advance material along the surface.

It is also a feature of the invention to provide conveying apparatus including a conveyor surface laterally curvate in shape and which by virtue of bodily movement through an orbital curvilinear path all points of which are equidistant from the axis of curvature of the conveyor surface causes material to advance smoothly over said conveyor surface horizontally or upwardly, as well as downwardly if so desired.

Another object of the invention resides in the provision of an oscillatory conveyor having a laterally curvate conveyor surface and which functions to provide a substantially continuous flow of material longitudinally along that surface.

It is also an object of this invention to provide conveying apparatus including a laterally curvate conveying surface bodily movable through an orbital curvilinear path in such manner as to provide a substantially continuous flow of material along the conveyor surface and at the same time maintain that material substantially in constant contiguity or constant contact with the conveyor surface.

Still a further object of the invention resides in the provision of conveying apparatus capable of conveying material along a laterally curvate path or upwardly along an inclined path, or both, and which includes mechanism whereby the material is moved forwardly by alternate direct propulsion and momentum travel.

It is also an object of this invention to provide conveying apparatus which is economical to construct and use, has a high capacity, provides a rapid flow of material, and which may convey material downwardly, horizontally, or upwardly along either a straight or laterally curvate path, and which may be reversed as to direction of flow of material by simply reversing the direction of operation of the prime mover actuating the conveyor.

Still another feature of the invention resides in the provision of conveying apparatus capable of performing any of the functions hereinabove mentioned, and which is economical both to manufacture and use and has a high conveying capacity.

While some of the more salient features, characteristics and advantages of the instant invention have been above pointed out, others will become apparent from the following disclosures, taken in conjunction with the accompanying drawings, in which.

As shown on the drawings.

Figure 1:
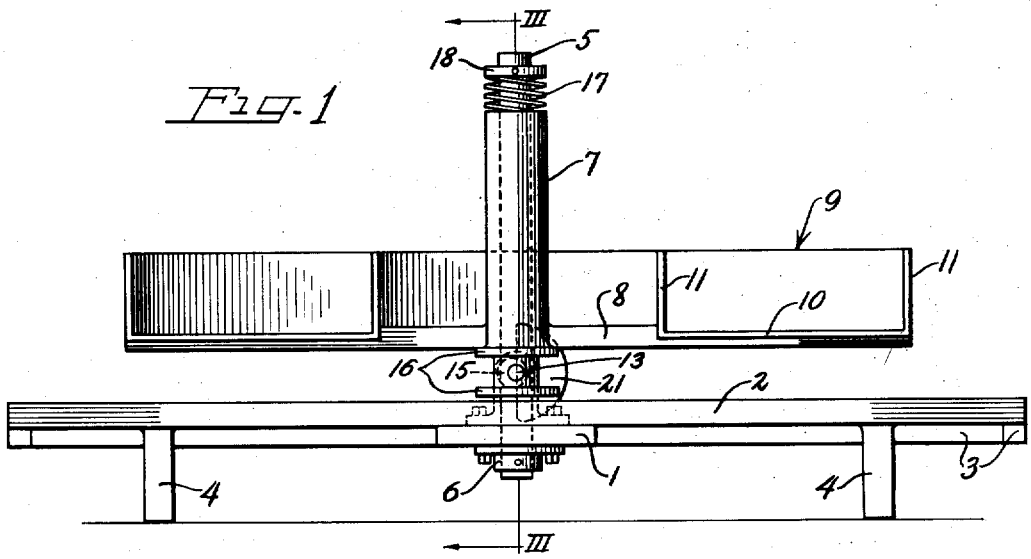
Figure 1 is a front elevational view of apparatus including a curvate conveyor embodying principles of the instant invention.

In that embodiment of the instant invention illustrated in Figures 1 to 6 inclusive, there is shown a frame structure including a centrally disposed platform 1, a cross member 2, and diagonal members 3—3, all rigidly secured together and supported by legs or standards 4.

A fixed non-rotatable shaft 5 extends vertically through the platform 1 and is supported by means of a collar 6 bolted or otherwise secured to the bottom of the platform. A supporting sleeve 7 floats on the fixed shaft 5 and is both slidable and rotatable relatively to this shaft. A plurality of spaced radial arms 8 extend from the sleeve 7 and support or carry a conveyor 9 which, in the illustrated instance, is shown in the form of a trough of substantially rectangular cross section including a bottom 10 and concentric inner and outer walls 11—11, but which may, of course, have substantially any desired cross-sectional configuration. For example, in many cases it may be desirable to utilize a trough having a cross-section substantially that of a flattened V to reduce side wall friction. The conveyor 9 is laterally curvate about a suitable center which is preferably the center of the shaft 5. In the illustrated instance, the conveyor is shown as extending throughout a semi-circle, but it will be appreciated that the conveyor element itself may extend through or span an arc of any desired angular degree.

Figure 5:
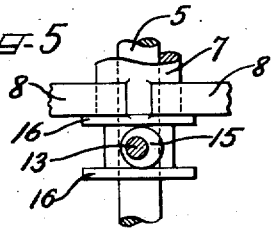
Figure 5 is a fragmentary vertical sectional view taken substantially as indicated by the line V—V of Figure 3.
Figure 6:
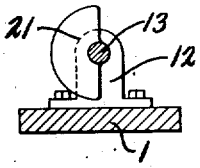
Figure 6 is a fragmentary vertical sectional view taken substantially as indicated by the line VI—VI of Figure 3.

The mechanism for actuating the conveyor trough 9 includes a pair of spaced bearings 12 mounted on the central platform 1 in position to support a shaft 13 which extends longitudinally of the platform beneath the conveyor 9. On the outer end of this shaft is a pulley wheel 14 or the equivalent through which the shaft may be rotated by any suitable prime mover, not illustrated in the drawings. On the inner end thereof the shaft 13 is provided with an eccentric head 15, as best seen in Figure 5, this head being disposed between vertically spaced flanges 16—16 on the sleeve 7, the space between these flanges being just sufficient to nicely accommodate the head 15. Consequently, when the shaft 13 is rotated the eccentric head 15 will cause a reciprocatory vertical movement of the sleeve 7 and conveyor 9 relatively to the fixed shaft 5. The amount or throw of this vertical movement depends upon the degree of eccentricity of the head 15 relatively to the shaft 13. A coiled spring 17 is preferably disposed around the shaft 5 between the upper end of the sleeve 7 and a collar 18 pinned or otherwise secured to the shaft. This spring functions as a cushioning or shock-absorbing medium.

Figure 2:
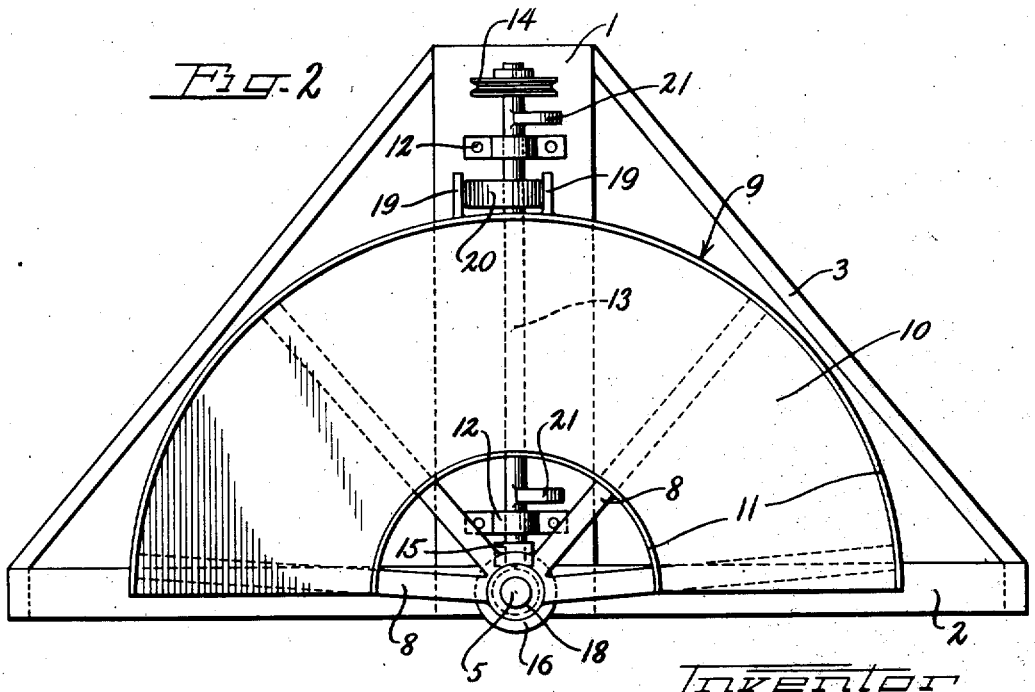
Figure 2 is a top plan view of the structure seen in Figure 1.
Figure 4:
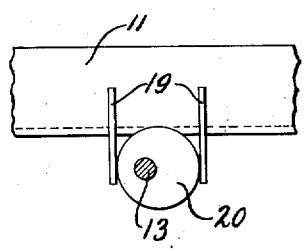
Figure 4 is a fragmentary vertical sectional view taken substantially as indicated by the line IV—IV of Figure 3.
Figure 3:
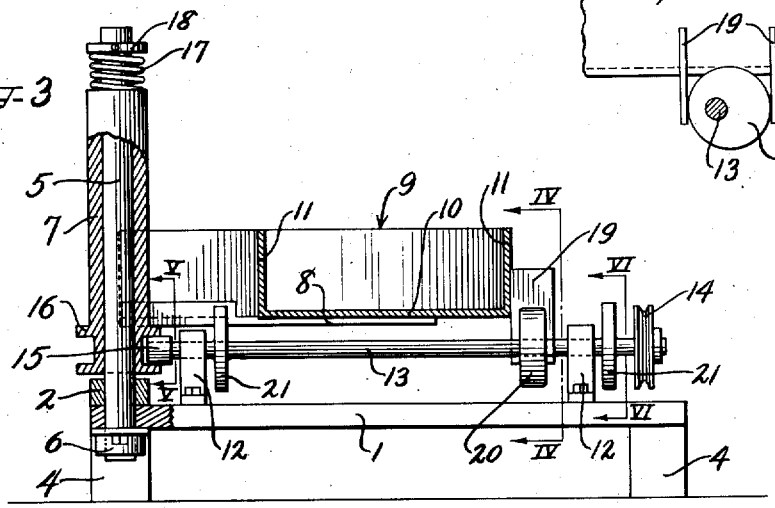
Figure 3 is a transverse vertical sectional view, with parts broken away and parts shown in elevation, of the structure of Figure 1, taken substantially as indicated by the line III—III of Figure 1, looking in the direction of the arrows.

Means are also provided for the simultaneous imposition of a horizontal force component to also move the conveyor 9. With reference more particularly to Figures 2 and 4, it will be seen that the conveyor 9 is provided with a pair of spaced lugs 19—19 extending outwardly from the outer side wall 11 substantially at the midpoint of the conveyor. Between these lugs is an eccentric roll 20 fixed to the shaft 13, and the rotation of the shaft will thereby cause a horizontal oscillatory movement of the conveyor 9 and sleeve 7 relatively to the fixed shaft 5. The throw of this movement is of course dependent upon the degree of eccentricity of the roll 20 relatively to the shaft 13. Very effective counterbalancing of the conveying structure may be simply had by the provision of one or more counterweights 21 on the shaft 13 as clearly seen in Figures 2 and 6, which counterweights may be of any desired configuration, being illustrated in the form of semi-circular weights, and are disposed oppositely to the eccentricity of the roll 20. With the use of these counterweights, vibrations are effectively minimized insofar as the supporting structure and surrounding structures are concerned, and the resultant operation is smooth and requires a minimum of power as well as permitting the use of relatively light weight material in the frame construction.

The conveying structure above described in connection with the showing in Figures 1 to 6 inclusive of the drawings is highly desirable for effecting a change of direction of material during the conveying thereof. With the structure illustrated, linear conveyors may be associated with the curvate conveyor, and material will pass in one direction along one linear conveyor, be turned 180° by the curvate conveyor and passed in reverse direction along the other linear conveyor. Obviously linear conveyors at right angles to each other may be connected by a curvate conveying element embodying principles of this invention and spanning an arc of substantially 90°.

The simultaneous imposition of the vertical movement by the eccentric head 15 and the horizontal movement by the eccentric roll 20 results in the conveyor traveling bodily through an orbital curvilinear path which path is substantially perpendicular to the conveyor surface, and all points of which path are substantially equidistant from the axis of curvature of the conveyor, namely, the center of the shaft 5.

The orbital conveyor path may have the configuration of a circle if the eccentrics 15 and 20 are in proper phase and of approximately the same degree of eccentricity. In the event the eccentric 20 is given a throw substantially twice that of the eccentric 15, the resultant orbital path will be of generally elliptical configuration of which the major axis will be substantially twice the length of the minor axis. In the event an elliptical path is used, it is preferable to have the major axis of the elliptical path substantially paralleling the surface of the conveyor. It is also preferable for most conveying purposes to utilize an elliptical path in which the major axis is substantially triple the length of the minor axis, which may be acquired with the illustrated structure by giving the eccentric 20 a throw three times as great as the eccentric 15. This path results in a very rapid and smooth movement of conveyed material.

The operation of the instant invention will, for the purpose of convenience, be explained in connection with an oval orbital path. The major axis of this oval or elliptical path will substantially parallel the longitudinal axis of the conveyor surface. During the cyclic orbital movement of the conveyor, centrifugal force and momentum alternately combine with and act against the force of gravity on the conveyed material. Hence at the lowest portion of the elliptical path, a particle of material bears against the conveyor surface with substantially twice its own weight; at each end of the major axis of the path when the conveyor is in mid-path position, the pressure of a particle against the conveyor surface will be substantially equal to the weight of the particle; and at the highest portion of the path, the pressure of a particle on the conveyor surface will be substantially nil. The direction of travel of the conveyor through its orbital path is substantially opposite to the flow of material. For example, assuming that the orbital path is of generally a counter-clockwise direction, the material will move along the arcuate conveyor surface from the left-hand end to the right-hand end, as the conveyor is viewed in Figures 1 and 2. The converse is also true, and therefore if it is desired to reverse the direction of travel of material along the conveyor, it is simply necessary to reverse the direction of movement of the prime mover.

With the instant invention, it is apparent that a particle of material starting at the rear end of the major axis of the conveyor path will be carried bodily forward by the conveyor during the lower half of the orbital path. During the movement of the conveyor through the upper half of the path, the same particle will continue its forward motion relatively to the conveyor surface by virtue of the momentum imparted to it by the previous direct propulsion of the particle in the lower half of the orbital path. However, during the travel of the particle forwardly while the conveyor travels through the upper half of its orbital path, the conveyor travels rearwardly at the same time the particle moves forwardly and therefore the particle has a much greater effective travel than it did while the conveyor went through the lower half of the path.

The action of the conveyor is such that the material preferably moves continuously along the conveyor, rather than a step by step or intermittent motion; that is, there will be a continuous, smooth and substantially uniform flow of material from the discharge end of the conveyor. In many cases such as where drying of the conveyed material is desired, or it is desired to preserve the surface of the conveyor from the action of abrasive and sharp material, or it is desired to prevent unintentional fragmentation of material, etc., it is preferable to maintain the material substantially in constant contiguity or constant contact with the conveyor surface during its travel. Both the continuous material flow and the maintenance of the material substantially in contiguity or contact with the conveyor surface may be provided by a proper correlation of conveyor speed with a particular orbital axis, which axis is preferably at substantially a right angle to the conveyor surface. In the case of an elliptical orbital path, this correlation will be between conveyor speed and the minor axis, especially when the major axis is in the preferable position of paralleling the conveyor surface. This correlation may be calculated in advance. A satisfactory conveyor speed, that is, the number of cyclic revolutions per minute, may be determined by dividing 1 by the radius of a circular path or by ½ of the minor axis of an elliptical path, taking the square root of the quotient and multiplying by 187.7. The speed so calculated may be varied approximately 20% either way in the case of a circular orbital path, approximately 30% either way where the major axis is substantially twice the length of the minor axis, and substantially 40% either way for an elliptical path where the major axis is substantially triple that of the minor axis. The calculated correlation will provide both continuous flow of material, and the maintenance of the material substantially in constant contiguity or constant contact with the conveyor surface. For example, a satisfactory practical speed for a circular orbital path of ½ diameter or an elliptical path with a ½ inch minor axis would be 375 cyclic revolutions per minute.

Where material is conveyed below the horizontal with gravity further aiding the flow, the conveying speed may increase above that resulting from horizontal conveying, and where material is conveyed up an incline, there may be a lessening of conveying speed. It will be appreciated that some variation in the above speed ranges may be desirable for certain materials, but for most discrete materials these ranges are practical and desirable for conveying purposes. Substantially any form of material may be conveyed, such as crushed stone, grain, vegetables, packages, etc., provided the materials are of a non-tacky and non-flocculent character. The weight and size of the particles of conveyed material have substantially no bearing on the conveying, consistent with the constant speed of orbital movement of the conveyor.

Figure 7:
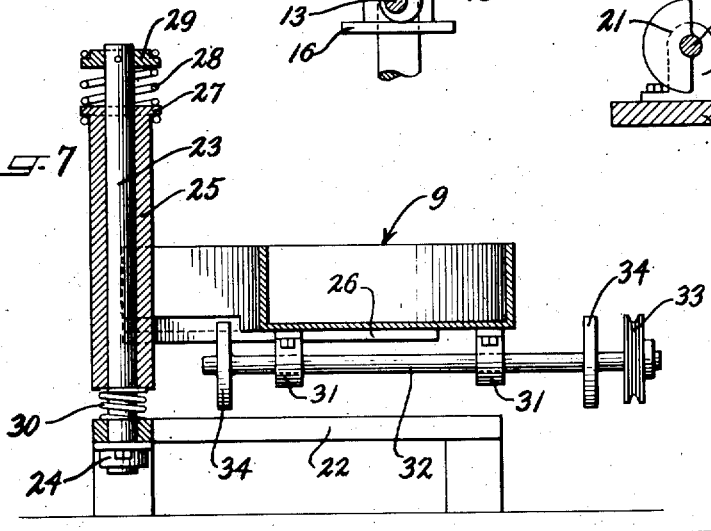
Figure 7 is a view similar in character and location to Figure 3, but showing a somewhat different form of construction also embodying principles of the instant invention.

With reference to Figure 7, a conveying apparatus of substantially the same general construction of that above described is illustrated, but the actuating means are of a somewhat different type. In this instance, a frame 22 is provided from which a stationary supporting shaft 23 extends vertically, the shaft being secured to the frame by a fixed collar 24 or the equivalent. A sleeve 25 floats freely on the shaft 23, and radial arms 26 extending from this sleeve support a conveyor 9 which for illustrative purposes is the same as the conveyor 9 previously described.

In this instance the sleeve 25 is provided with an outstanding flange 27 at its upper end, and the sleeve is supported in vertical position by a spring 28 one end of which is anchored above a collar 29 fixed to the shaft 23 and the other end of which is anchored below the shoulder 27 on the sleeve. Additional shock-absorbing support for the sleeve is provided by a coiled spring 30 disposed around the shaft 23 between the frame 22 and the lower end of the sleeve. Of course, with this construction the sleeve is free to move both rotatively and vertically with respect to the shaft 23, but both such motions are resisted to some extent by the action of the springs 29 and 30.

The actuating means for this conveyor include a pair of bearings 31 suspended from the lower portion of the conveyor 9, which bearings carry a rotatable shaft 32 having a pulley 33 or the equivalent on its outer end by means of which the shaft may be driven by any suitable prime mover, not illustrated in the drawings. The shaft 32 is preferably centrally disposed relatively to the conveyor 9. The shaft carries one or more counterweights 34, which may be of substantially the same character as the counterweights 21 above described and the centers of gravity of which are eccentric with respect to the shaft 32.

When the shaft 32 is rotated the thrust of the counterweights will cause the conveyor 9 to bodily move through an orbital curvilinear path against the resistance of the springs 28 and 30. By the proper adjustment or selection of springs 28 and 30, the conveyor may be made to follow an orbital path of any desired general configuration, circular, elliptical, or otherwise. The operation of this form of the invention is the same as that previously described in connection with the showing in Figures 1 to 6 inclusive.

Figure 8:
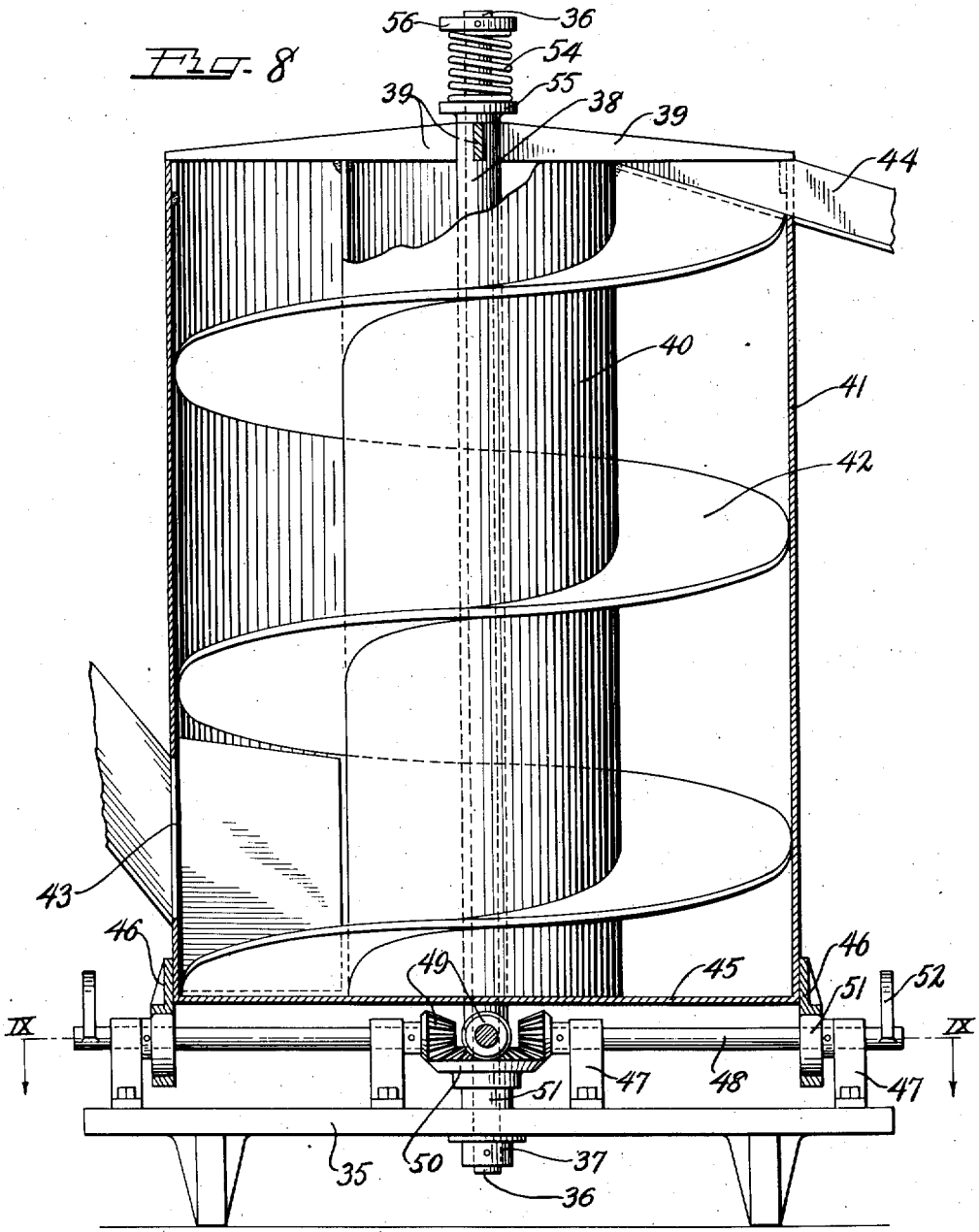
Figure 8 is a part sectional, part elevational view of apparatus incorporating a helical conveyor, also embodying principles of this invention.
Figure 9:
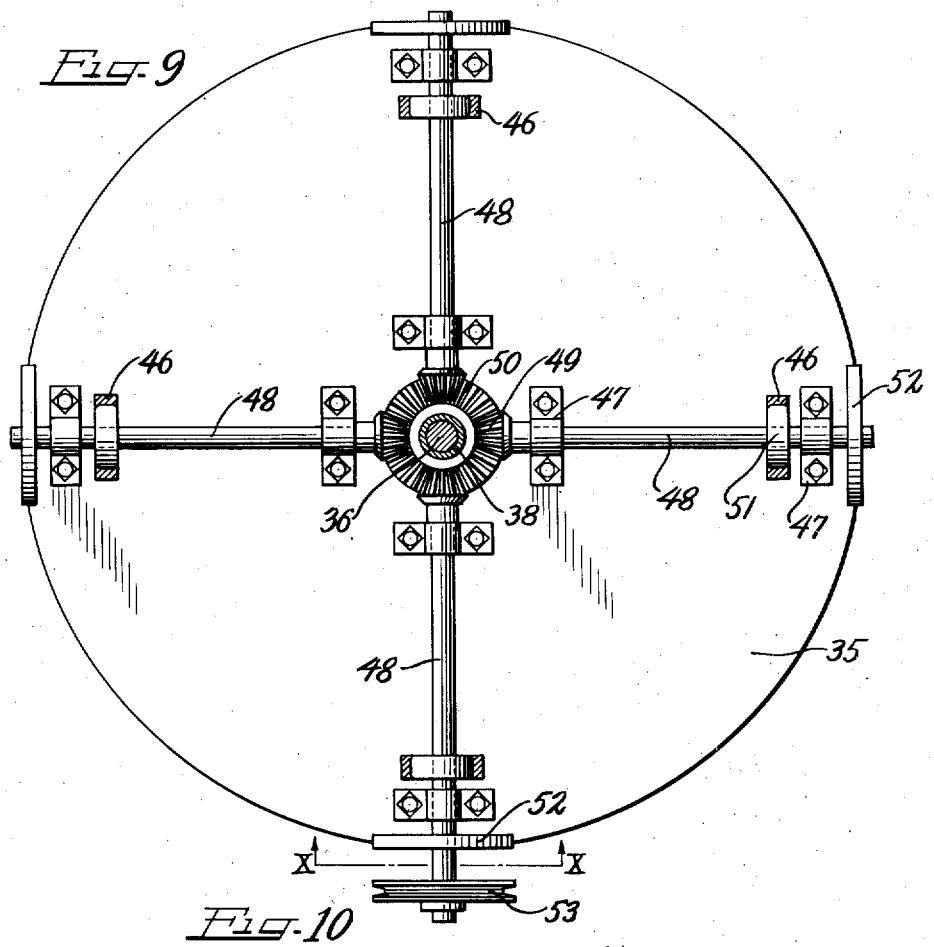
Figure 9 is a top plan sectional view, with parts in elevation, taken substantially as indicated by the line IX—IX of Figure 8.
Figure 10:
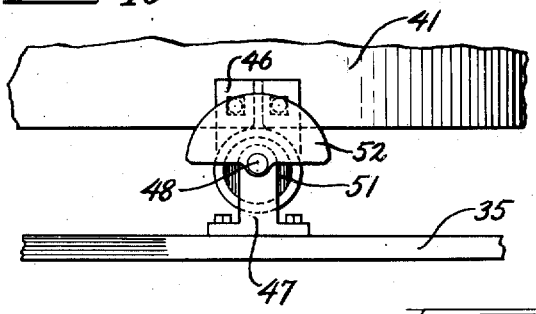
Figure 10 is a detailed transverse vertical sectional view taken substantially as indicated by the line X—X of Figure 9.

In that embodiment of this invention illustrated in Figures 8, 9 and 10, a helical type conveyor is shown designed to elevate material from a lower level to a higher level, this form of structure possessing all of the advantages of the previously described forms, and it will be noted that the conveyor occupies a minimum amount of floor space consistent with the elevation of material.

In this instance, a supporting frame or platform 35 is provided which may for convenience be circular in shape. A fixed upstanding and centrally disposed shaft 36 is secured to the platform 35 by means of a suitable collar 37 or equivalent structure. A sleeve 38 is freely telescoped over the shaft 36 and is both vertically and rotatably movable relatively to the shaft. This sleeve with the aid of radially extending arms 39 supports a conveyor which includes an inner cylindrical wall 40 and an outer cylindrical wall 41 spaced from the inner wall and concentric therewith. Between the walls 40 and 41 a helical element 42 is disposed, the upper surface of which provides a helical conveying surface. Material to be conveyed may be introduced upon the helical conveying surface through an opening 43 in the lower portion of the outer wall 41, and the material may be discharged from the upper end of the conveying surface by means of a suitable chute 44 extending through the upper part of the wall 41. The conveyor structure is preferably provided with a closed bottom as indicated at 45. Depending from the lower portion of the conveyor structure is a set of bearings 46, four in number in the illustrated instance. The entire conveyor structure is supported on this set of bearings by driving means now about to be described.

Mounted upon the platform 5 are four pairs of radially spaced bearings 47, each pair of which carries a rotatable shaft 48. As seen best in Figure 9, the shafts are preferably spaced equidistantly apart circumferentially of the platform 35. Each shaft 48 carries on its inner end a bevel pinion 49 which meshes with a bevel gear 50 carried upon a sleeve 51 loosely disposed around the shaft 36. Each shaft 48 also carries an eccentric 51 rigidly mounted upon the shaft and positioned to seat within the respective bearing 46 depending from the conveyor structure. At its outer end, each shaft carries a counterweight 52 which may be semi-circular as illustrated or any other desirable shape, but which is preferably disposed on the shaft 48 opposite to the throw of the eccentric 51. One of the shafts 48 may be extended to carry a pulley 53 or other suitable member for connection to a prime mover, not illustrated.

When the shaft carrying the pulley 53 is rotated by the prime mover, it will be appreciated that all of the shafts 48 will be likewise rotated in the same direction by virtue of the freely movable bevel gear 50. Thus, all of the eccentrics 51 carrying the conveyor will be rotated in a manner to impart a bodily movement of the conveyor relatively to the shaft 56 through an orbital path of substantially circular configuration. The eccentrics 51 are, of course, preferably in phase with each other. All points of the orbital path will be substantially equidistant from the axis of curvature of the conveyor, namely, the center of the stationary supporting shaft 36. A shock-absorbing coil spring 54 may be disposed between a flange 55 on the sleeve 38 and a collar 56 fixed to the shaft 36. The counterweights 52 augmented by the spring 54 effectively counterbalance the action of the conveyor and minimize any vibrations that may be transmitted to the platform 35 and adjacent building construction. The supporting parts of the conveyor may therefore be made of relatively light weight material.

The action of the conveyor traveling bodily through its orbital path will cause a movement of material upwardly along the conveying surface 42. The movement of the material results solely from the action of the conveyor and is not augmented by pressure of oncoming material or by virtue of any step construction on the conveyor surface. By proper correlation of the speed of travel of the conveyor through its orbital path with the axis of the path in a direction substantially normal to the conveyor surface at any particular point, the material may be caused to advance upwardly over the conveyor surface continuously, in a smooth and substantially uniform flow, and the material may be maintained substantially in constant contiguity or constant contact with the conveyor surface, all in the manner previously described in connection with the showing in Figures 1 to 6 of the drawings. In this instance, too, the material is advanced by alternate direct propulsion and momentum travel. As in the previously described embodiment, also, the direction of material flow may be reversed, simply by reversing the prime mover, and this is very desirable when it is desired to quickly empty the conveyor for any reason.

Figure 11:
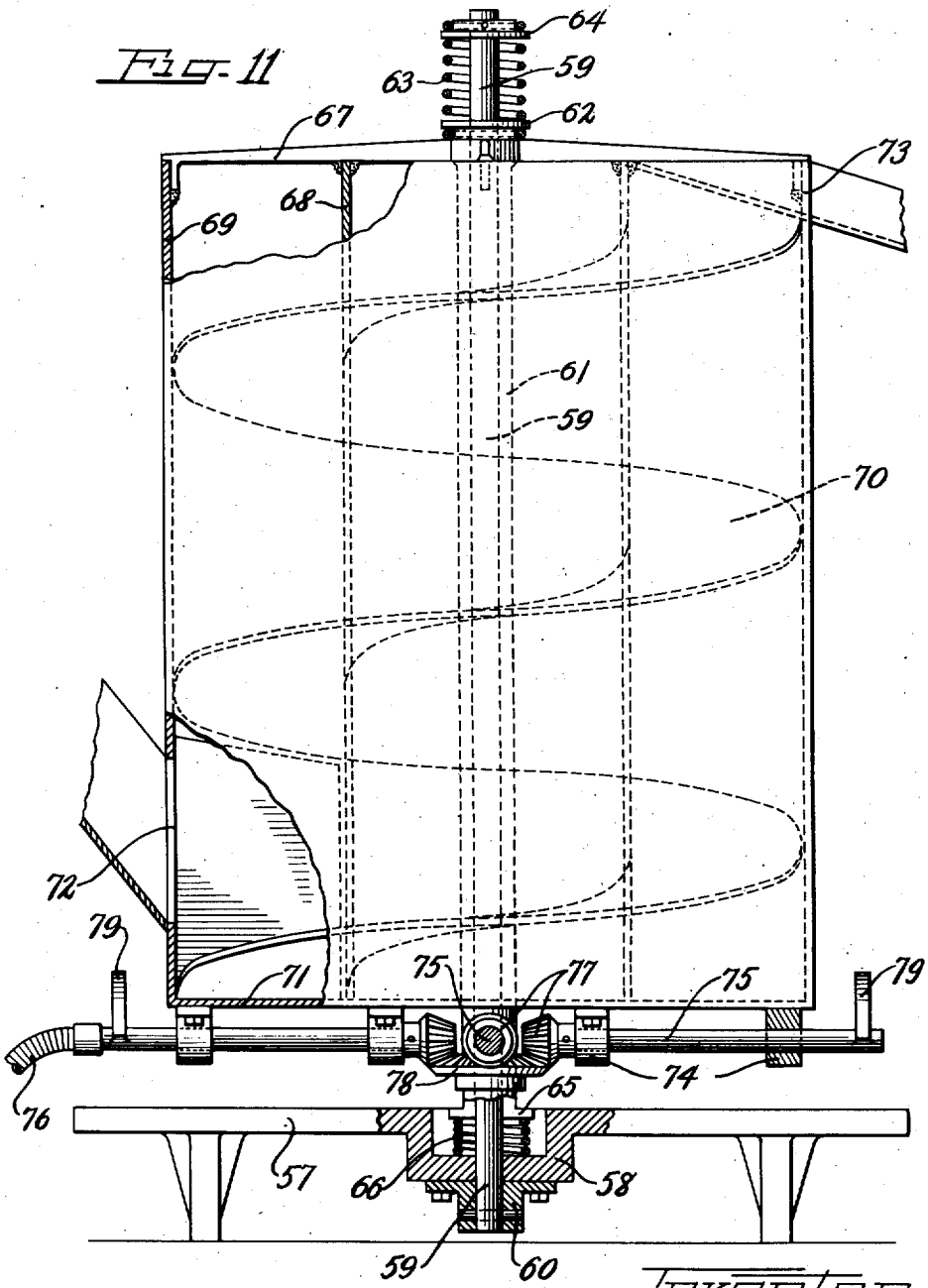
Figure 11 is a part sectional, part elevational view of a helical type conveyor embodying principles of this invention, but illustrating a different form of construction from the showing in Figure 8.

In Figure 11 I have illustrated an operating mechanism for a helical conveyor somewhat akin to that previously described in connection with Figure 7. In this instance, a platform frame 57 is shown which may be centrally recessed as indicated at 58. The platform is preferably circular, and extending upwardly from the center of the platform is a fixed stationary supporting shaft 59 which is secured to the platform by a collar 60 or equivalent means.

A sleeve 61 freely floats on the shaft 59 and is supported by and between spring elements. At the top thereof the sleeve is flanged as at 62, and a coiled spring 63 is engaged around the sleeve beneath the flange, the other end portion of the coiled spring being engaged above a collar 64 fixed to the supporting shaft 59. At the lower end thereof, the sleeve is flanged as indicated at 65 and rests upon a spring 66 in the recess of the platform, this spring 66 being attached both to the lower end of the sleeve and the platform, if so desired.

The sleeve carries a helical conveyor by the aid of radially extending arms 67, the conveyor including an inner cylindrical wall 68, an outer cylindrical wall 69, and a helical element 70 disposed between the walls, the structure being bottomed as indicated at 71. In the lower portions thereof an inlet at 72 is provided through which material may be introduced onto the conveying surface provided by the element 70, and near the upper end thereof the outer wall 69 may be provided with discharge means as indicated at 73.

On the bottom thereof, the conveyor structure carries a number of pairs of radially spaced bearings 74, there being four pairs of such bearings in the illustrated instance. Each pair of bearings carries a rotatable shaft 75, one of which shafts may be equipped with a flexible drive connection as indicated at 76 leading to any suitable form of prime mover, not illustrated. At the inner end thereof each shaft 75 carries a bevel pinion 77 in mesh with a bevel gear 78 loosely disposed around the extension of the sleeve 61. Near its outer end, each shaft 75 carries a counterweight 79 eccentrically disposed relatively to the shaft. All of the counterweights 79 are preferably in phase with each other.

In operation, it will be noted that when one of the shafts 75 is driven through the medium 76, all of the shafts will be simultaneously rotated. The counterweights 79 will provide a thrust against the bearings 74 on the bottom of the conveyor structure, and move the conveyor bodily through an endless curvilinear orbital path. The movement of the conveyor through its orbital path will be resisted to some extent by the springs 63 and 66. By proper adjustment or selection of these springs, the general configuration of the orbital path may be determined, so that movement of the conveyor may be through a circular, an elliptical, or an orbital path of some other configuration. As in the previous embodiments, all points of the orbital path will be substantially equidistant from the axis of curvature of the conveyor, namely, the center of the shaft 59, and in the event an elliptical path is selected, the major axis of the ellipse preferably parallels the longitudinal axis of the conveying surface as nearly as possible, and this major axis of the ellipse for rapid conveying is preferably triple the length of the minor axis. The movement of material along the conveying surface is substantially the same as for the previously described embodiments.

In connection with the structures illustrated in Figures 7 and 11, the orbital path of travel for the conveyor may not be approximately a circle or approximately an ellipse, but may be of some warped configuration. Such a warped configuration might also be acquired with the other illustrated embodiments of the invention by placing the eccentrics out of phase with each other. In such an event, the somewhat critical speed or correlation of speed of movement of the conveyor with the throw in a direction substantially normal to the conveying surface at any particular point may also be previously determined by calculation. In this event, there will be a maximum displacement of the conveyor above a median position of different length than the maximum displacement below median position. The length of the former displacement is divided by the latter squared. The square root of the quotient is taken and multiplied by 187.7. That particular speed, of course, may be varied up or down approximately 20% in either direction if the path approaches a circle, approximately 30% if the path approaches an ellipse with the major axis substantially twice the length of the minor axis, and approximately 40% if the major axis is substantially triple the minor axis. However, the calculated speed will result in a continuous smooth and substantially uniform flow of material upwardly along the conveying surface, together with the maintenance of the material substantially in constant contiguity or constant contact with the conveyor surface.

Figure 12:
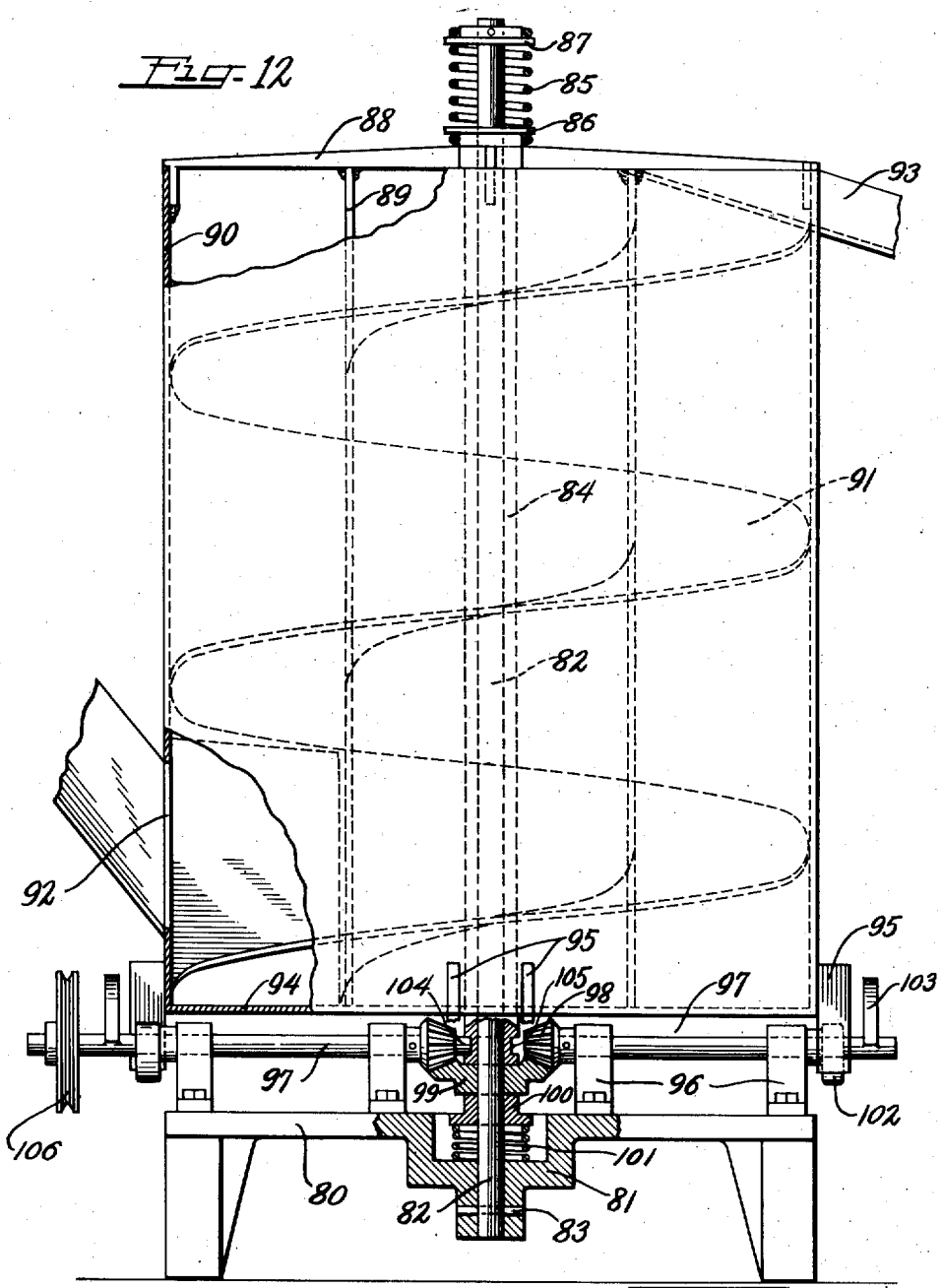
Figure 12 is also a part sectional, part elevational view of a helical type conveyor embodying principles of this invention, but incorporating a still different form of construction.

In Figure 12 I have illustrated a form of helical conveyor somewhat akin in its operation to the above described form illustrated in Figures 1 to 6 inclusive of the drawings. In this instance, a supporting platform 80 is provided which may be recessed as indicated at 81. A stationary supporting shaft 82 extends upwardly from this platform and is secured to the platform in any suitable manner such as by a pin 83.

A sleeve 84 floats on the shaft 82 and is movable both vertically and rotatably relatively to the shaft. This sleeve is suspended from its upper end by means of a spring 85 engaged at one end beneath the flange 86 on the sleeve and at the other end above a collar 87 fixed to the supporting shaft 82. By means of radially extending arms 88, the sleeve carries a conveyor construction including an inner cylindrical wall 89, an outer cylindrical wall 90 concentric therewith, and a helical conveying element 91 disposed between the walls. An inlet 92 for charging the conveyor is provided through the outer wall in the lower part of the construction, and a discharge outlet 93 may be provided near the upper end of the structure. The conveyor assembly may be bottomed as indicated at 94. Extending outwardly and downwardly from the lower edge of the conveyor assembly are a number of pairs of lugs 95, there being four such pairs in the illustrated instance, the lugs of each pair being spaced circumferentially.

Mounted on the platform 80 is four pairs of radially spaced bearings 96, each pair of which carries a rotatable shaft 97 having on its inner end a bevel pinion 98 in mesh with a bevel gear 99 loosely disposed around the supporting shaft 82. The gear 99 is seated on a bushing 100 which in turn is seated upon a shock-absorbing spring 101 disposed around the shaft 82 in the recess 81 of the platform. Each of the shafts 97 also carries an eccentric 102 near the outer end thereof, which eccentric is disposed between the corresponding pair of lugs 95 on the conveyor assembly. Outside of the eccentric, each shaft carries a counterweight 103 of any suitable construction, but disposed oppositely to the throw of the eccentric 102.

One of the shafts 97 is preferably provided with an inner extension in the form of an eccentric head 104 which extends within an annular groove 105 in the lower portion of the conveyor supporting sleeve 84. This same shaft may be equipped with a pulley 106 or equivalent device at its outer end in connection with a suitable prime mover, not illustrated.

From the foregoing description, it will be seen that when one of the shafts 97 is rotated from the prime mover, all of the shafts will be rotated simultaneously, and the eccentrics 102 will impart a circular oscillatory motion to the conveyor assembly. At the same time, a vertical reciprocatory motion will be imparted to the conveyor assembly by the action of the eccentric head 104 within the groove 105 in the conveyor carrying sleeve 84. The resultant of these two component forces will be an orbital path of travel through which the conveyor is bodily moved relatively to the supporting shaft 82. If the throw of the eccentrics 102 is the same as the throw of the eccentric head 104, the orbital path will be generally circular in configuration, while if the throw of the eccentrics 102 is greater than that of the eccentric head 104, the orbital path will be generally elliptical. The action of the conveyor is counterbalanced by the counterweights 103 and by the springs 85 and 101 acting in a shock-absorbing capacity so that vibration will be minimized insofar as supporting and adjacent structures are concerned.

The structure of Figure 12 embodies all the advantages and operates in the same manner as the previously described embodiments, to convey material upwardly along the inclined conveying surface.

From the foregoing, it is apparent that I have provided conveying apparatus wherein material may be caused to flow up an incline by virtue of a bodily movement of the conveyor surface through an orbital path. It will also be noted that with the conveying apparatus embodied in this invention, such material may be caused to travel not only upwardly but downwardly or horizontally, if so desired, and be made to follow a laterally curvate path. Further, the material may be caused to flow continuously, smoothly and substantially uniformly, and if so desired may be maintained substantially in constant contiguity or constant contact with the conveyor surface.

It should also be noted that the present invention may be used in conjunction with the drying of material, processing of material, and for other purposes, and the apparatus is highly economical to manufacture and use and exceedingly rapid and efficient in operation. It will further be apparent that I have provided a novel method of conveying embodied in the instant invention.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. In conveying apparatus, a helical conveyor element with its axis of curvature vertical, and actuating means arranged to move said conveyor element through an endless curvilinear path resulting from vertical reciprocation and angular oscillation about the axis of said helical conveyor and so that each point of the conveyor surface describes an endless orbit lying in a cylindrical surface co-axial with the helix axis, said path being so disposed relatively to the surface of said element and the cyclic speed of said element being so correlated with the throw of said element as it travels said path that the material continuously moves upwardly over the surface of said element and is constantly substantially in contiguity with said surface.

2. In conveying apparatus, a vertical support, a helical conveyor thereon and freely movable rotatably and vertically relatively thereto, and actuating means arranged to move said conveyor bodily through an endless curvilinear path to cause a movement of material upward over the surface of said conveyor, shock absorbing means supporting said conveyor, and said actuating means being carried by said conveyor.

3. In conveying apparatus, an upright helical conveyor surface movable both vertically and rotatably with respect to the vertical axis of the helix, actuating means to impart to said conveyor surface a motion having a major and a minor axis to cause an upward flow of material, said actuating means being so arranged that the conveyed material is carried by the conveyor surface in the lower part of its movement and travels by momentum while the conveyor surface moves through the upper part of its movement.

4. In conveying apparatus, an upright helical conveyor surface movable both vertically and rotatably with respect to the vertical axis of the helix, actuating means to move said conveyor surface through an endless curvilinear path having a major and a minor axis to cause an upward flow of material, and there being such correlation between the speed of said actuating means and the throw of the conveyor surface in the general direction of the minor axis that conveyed material continuously advances with a slight undulating movement.

5. In an apparatus for moving material upwardly, a substantially helical conveying surface and means for imparting to said surface an orbital motion the components of which embrace vertical reciprocation and angular oscillation of the surface about the axis thereof, said means having the speed thereof correlated with the magnitude of the components to effect carrying of the material by said surface in substantially the lower part of the orbit and advance the material while the surface moves reversely through the upper part of said orbit.

6. A method of moving material upwardly along an upstanding helical conveyor surface, which includes giving to said surface a motion resulting from a vertical reciprocation and an angular oscillation about the axis of the helix, so that substantially each point of the surface describes an endless orbit lying in a cylindrical surface co-axial with the helix axis, and correlating the speed with the magnitude of the components so that the material is carried by said surface in the lower part of the orbit, and is permitted to advance while the surface moves reversely to the material flow through the upper part of said orbit.

7. In a method of moving material upwardly along an upstanding helical conveyor surface, which includes the steps of giving to said surface a motion resulting from a vertical reciprocation and an angular oscillation of the surface about the axis of the helix so that substantially each point of the surface describes an endless orbit lying in a cylindrical area co-axial with the helix axis, and correlating the speed with the magnitude of the components so that the material is carried upwardly by said surface.

8. In a conveyor for moving material upwardly from one elevation to another, the combination of a conveyor including a rigid helical conveying surface, shaft means defining a given vertical axis about which said conveyor is guided, means supporting the conveyor for vibration in a path of movement the components of which are vertical and horizontal producing a resultant inclined arcuate movement, and means to impart to the conveyor a vibratory motion along the resultant inclined arcuate path in the direction of flow of the material along the conveyor.

9. In a conveying device for moving material upwardly from one elevation to another, the combination of a conveyor including a rigid conveying surface having an upward helical curve bearinged guide means defining a fixed vertical axis centrally of and along which said conveyor is guided.

10. In a conveying device for moving material upwardly from one elevation to another, the combination of a conveyor consisting of a rigid conveying surface having an upward helical curve about a vertical axis, a central rod at said axis on which said conveyor is guided for oscillatory movement thereon, spring means supporting the conveyor for vibratory motion with vertical and circular components, and motive means to impart to the conveyor a vibratory inclined arcuate movement having vertical and circular components the resultant of which is disposed at an angle relative to the conveying surface and in the direction of flow of material to convey the material along the conveying surface.

11. In an apparatus for moving material upwardly from one elevation to another, a substantially upstanding conveyor having a helical-like conveyor surface having substantially more than one convolution and mounted on central vertical guide means, resilient means for supporting said conveyor for oscillation about said central vertical guide means, means for imparting a motion resultant from a vertical reciprocation and an angular oscillation of the conveyor with respect to its axis, and driving means for operating said motion means at such speed as to overcome the pull of gravity on the material carried by said surface and so that said material is forced upwardly along said surface.

12. In an apparatus for moving material upwardly from one elevation to another, a substantially upstanding conveyor having a helical-like conveyor surface, resilient means for supporting said conveyor, means for imparting a motion resultant from a vertical reciprocation and an angular oscillation of the conveyor with respect to its axis, driving means for operating said motion means at such speed as to overcome the pull of gravity on the material carried by said surface and so that said material is forced upwardly along said surface, and guide means centrally of said conveyor and along which said conveyor is guided, said conveyor being of a cylindrical-like construction with the helical surface within the same and being supported endwise in vertical position about said guide means by said resilient means.

ROBERT M. CARRIER, JR.

REFERENCES CITED

The following references are of record in the file of this patent:

UNITED STATES PATENTS

| Number | Name | Date |
|---|---|---|
| 1,085,528 | Bighetti | Jan. 27, 1914 |
| 1,611,098 | Borner | Dec. 14, 1926 |
| 1,858,328 | Heymann et al. | May 17, 1932 |

FOREIGN PATENTS

| Number | Country | Date |
|---|---|---|
| 279,119 | Great Britain | Oct. 15, 1927 |
| 47,758 | Germany | July 12, 1889 |

Certificate of Correction

Reissue No. 22,904. August 12, 1947.

ROBERT M. CARRIER, Jr.

It is hereby certified that error appears in the printed specification of the above numbered patent requiring correction as follows: Column 13, line 45, after the word "curve" strike out *bearinged*; and that the said Letters Patent should be read with this correction therein that the same may conform to the record of the case in the Patent Office.

Signed and sealed this 14th day of September, A. D. 1948.

[SEAL]

THOMAS F. MURPHY,
*Assistant Commissioner of Patents.*